(12) United States Patent
McDonald et al.

(10) Patent No.: US 6,301,306 B1
(45) Date of Patent: Oct. 9, 2001

(54) METHOD AND APPARATUS FOR GENERATING A SHORT-RANGE WIRELESS DATA COMMUNICATION LINK

(75) Inventors: James A. McDonald, Buffalo Grove, IL (US); Takehiko Tsutsumi, Kanagawa (JP); William J. Wilson, Palatine, IL (US); Anders A. Eklof, Poolesville, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/579,934

(22) Filed: May 26, 2000

(51) Int. Cl.[7] .................................................. H04L 27/00
(52) U.S. Cl. ........................... 375/259; 375/279; 375/308
(58) Field of Search .................................... 375/259, 260, 375/295, 271, 302, 272, 279, 280, 303, 308; 340/870.18; 455/108

(56) References Cited

U.S. PATENT DOCUMENTS 5,581,576 * 12/1996 Lanzetta et al. .................... 375/216
6,177,861 * 1/2001 MacLellan et al. ................. 340/10.1
6,223,061 * 4/2001 Dacus et al. .......................... 455/574

OTHER PUBLICATIONS

"System Design Issues for Low power, Low cost Short Range Wireless Networking" IEEE Bhagwat et al, 1999.*

* cited by examiner

Primary Examiner—Temesghen Ghebretinsae
(74) Attorney, Agent, or Firm—Kenneth A. Haas

(57) ABSTRACT

A system for generating a short-range wireless data communication link through an over-the-air channel on a predetermined radio frequency (RF) carrier. The system integrates conventional RF techniques into a low-power and low-cost system for establishing short-range wireless data communication. The system generates short-range wireless data communication links between a transmitting unit (500) that transmits an operating signal carrying data, and a receiver unit (1000) that receives the operating signal without a synthesizer or a heterodyne scheme.

31 Claims, 6 Drawing Sheets

METHOD AND APPARATUS FOR GENERATING A SHORT-RANGE WIRELESS DATA COMMUNICATION LINK

FIELD OF THE INVENTION

The present invention relates generally to wireless communication systems and more particularly to a method and an apparatus for generating a short-range wireless data communication link through an over-the-air channel on a predetermined radio frequency (RF) carrier.

BACKGROUND OF THE INVENTION

Typically, short-range communication links between a transmitting unit and a receiving unit are established through wires. For example, a mouse or a keyboard may be connected to a computer and a video game controller may be connected to a video game console by a pair of wires or a coaxial cable. Restrictions in the length of a cable connecting the transmitting unit to the receiving unit may confine the location of either the transmitting unit or the receiving unit. In particular, the length of the cable connecting the video game controller to the console may prevent a user from sitting at a desired location such as a couch. Additional extension cables may be required to connect the video game controller to the console to establish a communication link. However, the additional extension cables may become entangled, which further restrict the location of the controller and enhance the frustration of the user for having to untie the cables. Furthermore, during periods of "excitement" when a video game is in play, the cables that connect the console and the controller may be loosened by the user's movement of the controller. Accordingly, the communication link established between the controller and the console may be disconnected. Such a catastrophic event during a critical and intense moment in a game may cause distress to the user.

More and more communication links are generated through wireless technology. Infrared waves, for example, have been used for generating wireless communication links between a transmitting unit and a receiving unit. In particular, the remote controllers for televisions, stereos, compact disc players, video cassette recorders, digital video disc players or any other entertainment equipment may use infrared waves. The utility of infrared waves, however, suffer many restrictions such as line-of-sight and directionality. In the context of operating a video game, for example, a wireless controller may use infrared waves to communicate with a video game console. An object, however, may impede a user's line-of-sight in which a signal may not be sent to the video game console by the controller. For example, a person or a piece of furniture may obstruct the line-of-sight path between the controller and the console. During the periods of "excitement" in a video game, the user rarely considers maintaining the controller within the line-of-sight path of the console. Furthermore, directionality may require the user to aim the controller within a particular range of angles with respect to the console to generate the communication link. A user sitting perpendicularly to the console may not have the controller correctly aimed at the console. That is, the controller may be aimed straight ahead, and then a communication link may not be established between the controller and the console.

Radio frequency may be used to generate short-range communication links. Current short-range radio frequency systems utilize conventional radio communication techniques of synthesizer and heterodyning to support communications in frequency bands such as the 2.4 Gigahertz (GHz) Industrial, Scientific, and Medical (ISM) band. The main components of a 2.4 GHz heterodyne receiver generally include: (1) a radio frequency (RF) amplifier, which is tuned to the desired radio frequency; (2) a first local oscillator; (3) a first mixer for heterodyning to a first intermediate frequency; (4) a first intermediate frequency (IF) amplifier; (5) a second local oscillator; (6) a second mixer for heterodyning to a second intermediate frequency; (7) a second IF amplifier; and (8) a demodulator. To prevent images and other spurious responses, the RF amplifier typically provides frequency selectivity to attenuate the mixing image. The first IF amplifier typically comprises ceramic or surface acoustic wave (SAW) technology filters to prevent spurious responses. Both local oscillators typically include synthesizers. However, such synthesizers and heterodyne techniques are neither low-power nor cost-effective to generate short-range wireless data communication links. Therefore, a need exists for a method and an apparatus for generating short-range wireless communication links through an over-the-air channel on a predetermined RF carrier at low-power and low-cost.

DETAILED DESCRIPTION OF THE PREFERRED EMBODIMENTS

The present invention provides a method and an apparatus for generating a short-range wireless data communication link through an over-the-air channel on a predetermined RF carrier. Therefore, generating wireless data communication links without concern for line-of-sight or directionality may alleviate the need to point a terminal device or a console hub at a particular path or direction. The present invention integrates conventional RF techniques into a low-power and low-cost method and apparatus for establishing short-range wireless data communication. This method and apparatus generate short-range wireless data communication links between a transmitting unit and a receiving unit without a synthesizer or a heterodyne scheme in the receiving unit.

Figure 1:
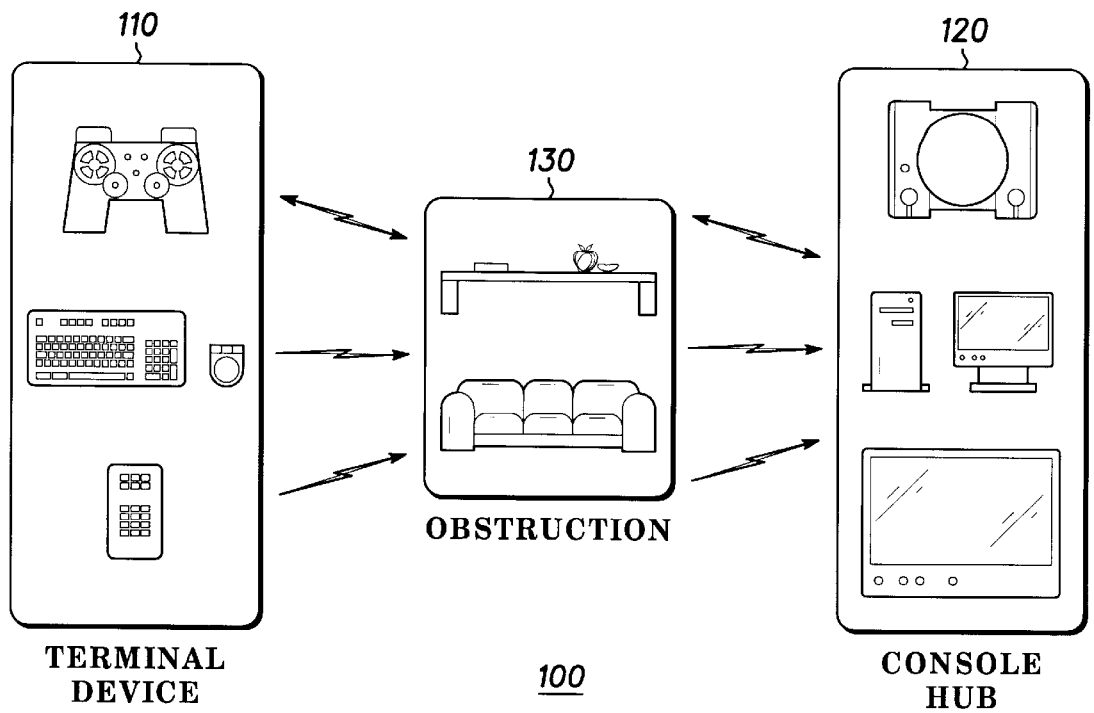
FIG. 1 is a block diagram of a system for generating a short-range wireless data communication link through an over-the-air channel on a predetermined RF carrier.

In a wireless communication system 100, as shown in FIG. 1, a terminal device 110 may establish a short-range wireless data communication link with a second terminal device or a console hub 120 through an over-the-air channel on a predetermined RF carrier. The wireless communication system 100 may be, but is not limited to, a time division multiple access (TDMA) system, a code division multiple access (CDMA) system, and a frequency division multiple access (FDMA) system. The terminal device 110 may be integrated into, but is not limited to, a video game controller, a computer mouse, a keyboard, a printer, an electronic planner, a remote controller for a television, a stereo, a digital video disc player, a video cassette recorder, and a compact disc player. The console hub 120 may be integrated into, but is not limited to, a video game console, a set of headphones, a computer, an electronic planner, a television, a stereo, a digital video disc player, a video cassette recorder, and a compact disc player. Both the terminal device 110 and the console hub 120 may be a standalone unit adaptable to the components listed above. For example, the terminal device 110 and the console hub 120 may be standalone units coupled to a video game controller and a video game console, respectively. In particular, the console hub 120 may be coupled to a port of the video game console where a video game controller would typically be connected to the video game console by a cable.

The present invention may alleviate the line-of-sight and directionality problems associated with other wireless communication methods, such as infrared waves, that provide data communication links between a terminal device 110 and a console hub 120. For example, an obstruction 130 such as, but not limited to, a coffee table, a sofa, or a person, may be within the line-of-sight path between the terminal device and the console hub in a communication system that operates on infrared waves. Accordingly, a data communication link may not be established between the terminal device and the console hub. In contrast, the present invention overcomes the problem of the obstruction 130 within the line-of-sight path between the terminal device 110 and the console hub 120 by generating a short-range wireless data communication link between the terminal device 110 and the console hub 120 through an over-the-air channel on a predetermined RF carrier.

Figure 2:
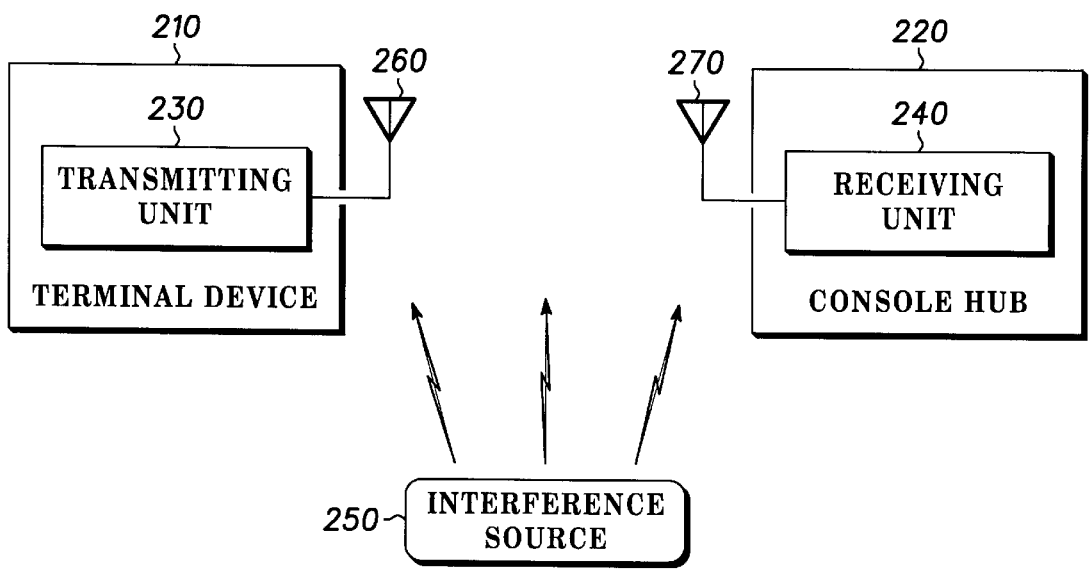
FIG. 2 is a block diagram of the present invention adapted in accordance for one-way transmissions.

The present invention may be adapted to establish data communication links for both one-way and two-way transmissions. As shown in FIG. 2, a terminal device 210 may be adapted to establish data communication links through an over-the-air channel on a predetermined RF carrier for one-way transmissions to a console hub 220. As noted above, a transmitting unit 230 may be integrated into the terminal device 210 or coupled to the terminal device 210 as a standalone unit. A receiving unit 240 may be integrated into the console hub 220 or coupled to the console hub 220 as a standalone unit.

The transmitting unit 230 adapted to the terminal device 210 may establish one-way transmissions by encoding data and transmitting an operating signal carrying the data through an antenna 260 to the receiving unit 240 adapted to the console hub 220. The receiving unit 240 receives the operating signal through an antenna 270 and recovers the data. The data may be, but is not limited to, data packets. The data includes information and overhead data, which may include framing and error detection codes, to support communications from the transmitting unit 230 to the receiving unit 240. In one-way transmissions, the console hub 220 does not establish return-data communication links to transmit a signal such as an acknowledgment signal indicating a successful transmission from the transmitting unit 230. For example, a transmitting unit 230 is adapted to a television remote controller. The remote controller transmits an operating signal carrying data to a receiving unit 240 adapted to the television, which in turn, does not transmit a signal back to the remote controller to acknowledge a successful transmission.

An interference source 250, which is further discussed in detail below, may generate an interference signal overlapping a transmission by a transmitting unit 230. Repetitious transmissions may be necessary t o overcome the interference signal. However, repetitious transmissions may disrupt other communication links and cause inefficient use of communication resources. Therefore, two-way transmissions between a terminal device 210 and a console hub 220 may be necessary to generate an acknowledgment signal indicating a successful transmission.

Figure 3:
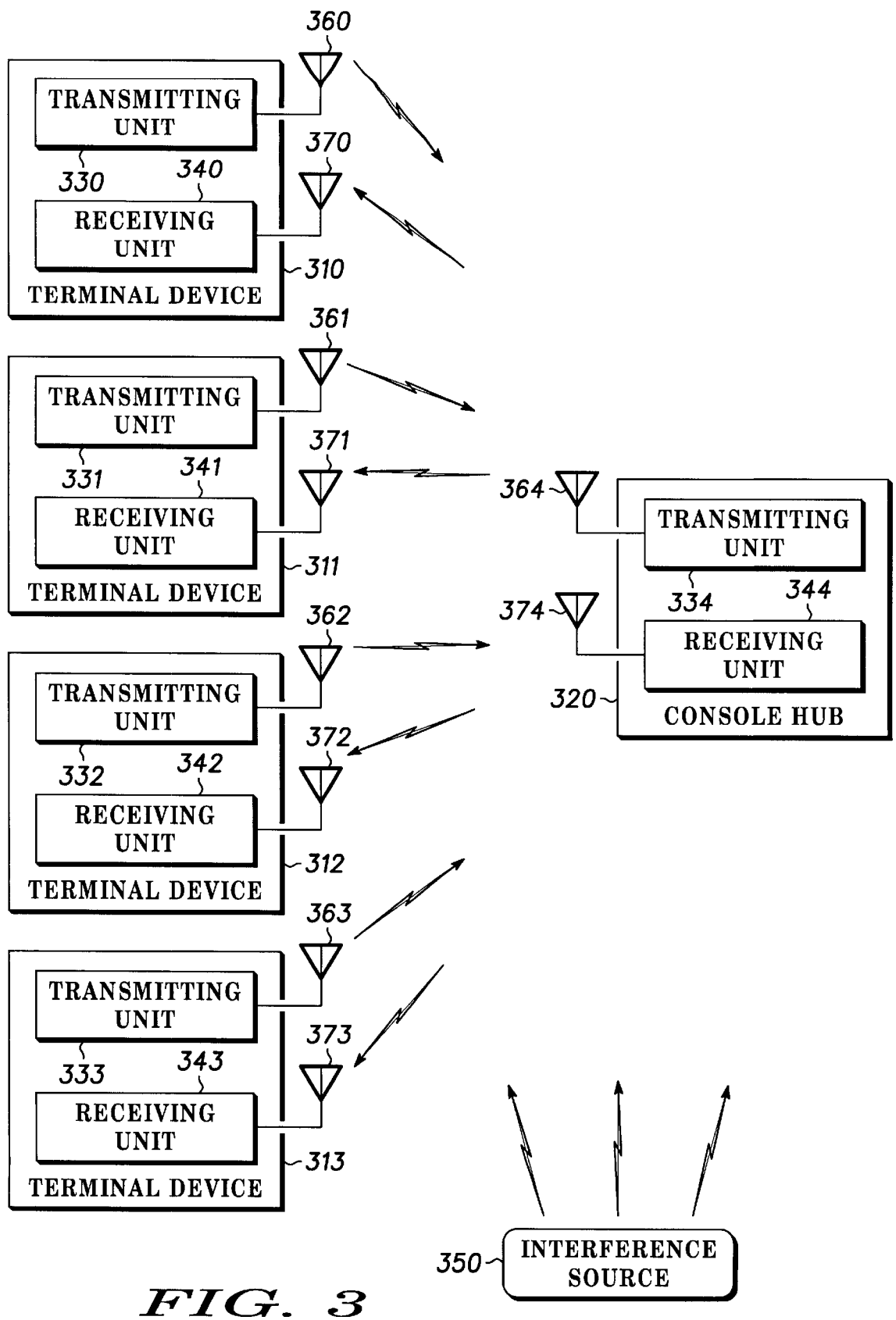
FIG. 3 is a block diagram of the present invention adapted in accordance for two-way transmissions.

In addition to transmitting an acknowledgment signal, a console hub 220 adapted for two-way transmissions may communicate with a terminal device 210 adapted for two-way transmissions. In particular, the console hub 220 may transmit a signal that provides, but not limited to, mechanical, visual, and audio effects to the terminal device 210. For example, the terminal device 210 is adapted to a video game controller that controls Boxer #1 in a boxing game. The console hub 220 transmits a signal, which indicates that Boxer #1 is punched in the game. Accordingly, the signal commands the terminal device 210 to vibrate indicating that Boxer #1 is punched. To reduce cost and to increase efficient use of communication resources, a console hub may be adapted to establish data communication links with a plurality of terminal devices to transmit a signal such as, but not limited to an acknowledgment signal indicating a successful transmission and a protocol signal containing timing information for transmissions. Now referring to FIG. 3, a plurality of terminal devices, generally shown as 310, 311, 312, and 313, and a console hub 320 may be adapted to establish data communication links through an over-the-air channel on a predetermined RF carrier for two-way transmissions. In contrast to one-way transmissions, two-way transmissions establish return-data communication links to transmit a signal, such as an information data signal, an acknowledgment signal that indicates a successful transmission, and a protocol signal containing timing information for transmissions. A transmitting unit, generally shown as 330, 331, 332, 333, and 334, and a receiving unit, generally shown as 340, 341, 342, 343, and 344, may be adapted to the plurality of terminal devices 310, 311, 312, 313 and the console hub 320 for two-way transmissions. The plurality of terminal devices 310, 311, 312, 313 may establish a data communication link through an over-the-air channel on a predetermined RF carrier with the console hub 320. The console hub 320, which in turn, may establish a data communication link through the same over-the-air channel with the plurality of terminal devices 310, 311, 312, 313. The transmitting units 330, 331, 332, 333, 334 adapted to the plurality of terminal devices 310, 311, 312, 313 may establish a data communication link through an over-the-air channel to transmit an operating signal carrying data to the receiving unit 344 adapted to the console hub 320. To overcome interference generated by, but not limited to, an interference source 350, the transmitting units 330, 331, 332,

333 may retransmit the operating signal on a plurality of opportunities during a period, which may exceed the expected length of interferences generated by the interference source 350. The interference source 350 may operate in the desired bandwidth of the transmitting units 330, 331, 332, 333, 334 and the receiving units 340, 341, 342, 343, 344. For example, the transmitting units 330, 331, 332, 333, 334 and the receiving units 340, 341, 342, 343, 344 may operate on the 2.4 GHz ISM band in which interference may be generated from microwave ovens and cordless telephones. The transmitting units 330, 331, 332, 333 may have a plurality of opportunities to transmit the operating signal to the receiving unit 344 adapted to the console hub 320 during a cycle to avoid distributive interference from a microwave oven. The microwave oven may cause interference for approximately 40 percent of each cycle of a power-line frequency at 60 hertz (Hz), which has a period of 16.667 millisecond (ms). Accordingly, the transmitting unit 334 adapted to the console hub 320 may establish a data communication link through the same over-the-air channel to transmit an acknowledgment signal to avoid unnecessary or repetitious transmissions of the operating signal. As noted above, the acknowledgment signal indicates a successful transmission by a transmitting unit 330, 331, 332, 333, 334. The acknowledgment signal may reduce the power consumption of the transmitting units 330, 331, 332, 333 adapted to the plurality of terminal devices 310, 311, 312, 313 and minimize the potential interference related to unnecessary transmissions.

Figure 4:
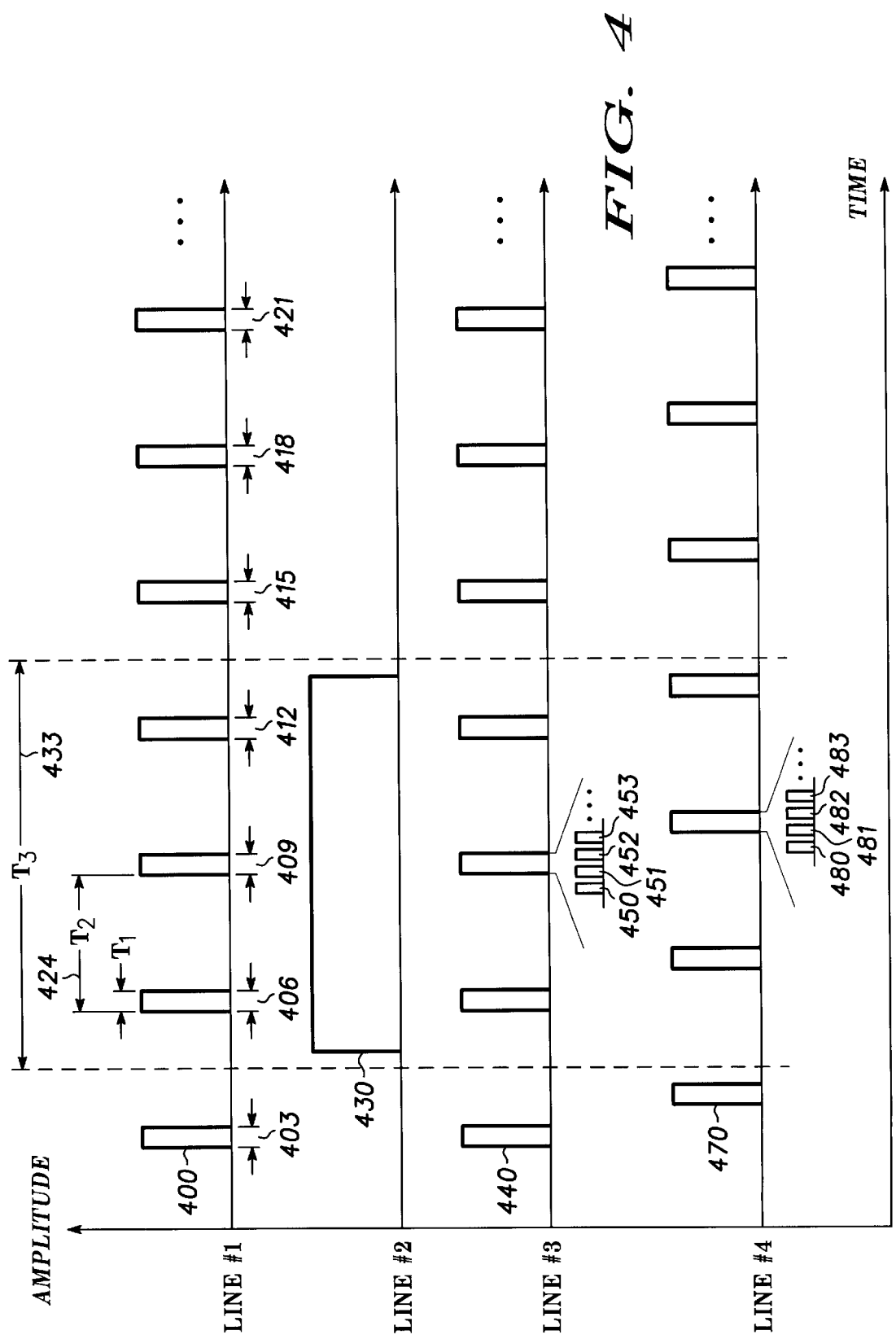
FIG. 4 is a timing diagram of a system for generating a short-range wireless data communication link through an over-the-air channel on a predetermined RF carrier for one-way and two-way transmissions.

FIG. 4 illustrates a timing diagram of one-way and two-way transmissions of data on a data communication link through an over-the-air channel on a predetermined RF carrier in a time division multiple access (TDMA) system. Line #1 illustrates a one-way transmission of a data packet 400 during a plurality of data packet time slots, generally shown as 403, 406, 409, 412, 415, 418, and 421, from a transmitting unit 230 to a receiving unit 240 on a data communication link through an over-the-air channel in a TDMA system. Each data packet time slot 403, 406, 409, 412, 415, 418, 421, which has a period of $T_1$, may be constant over time from packet-to-packet. Alternatively, period $T_1$ of the plurality of data packet time slots 403, 406, 409, 412, 415, 418, 421 may vary in accordance to a protocol or an amount of data transmitted from a transmitting unit 230. A data packet transmission interval 424, which is a period $T_2$ between transmission of the data packet 400, may be constant over time. Alternatively, the data packet transmission interval 424 may vary in accordance to a protocol.

Line #2 illustrates an interference signal 430 generated from an interference source 250, 350 such as, but not limited to, a microwave oven operating at a bandwidth of 2.4 to 2.4835 GHz. The interference signal 430, which may be, but is not limited to, an interference burst, may affect the transmission of a data packet 400 during an interference interval 433 with a period of $T_3$. A protocol for transmission of a data packet provides adequate transmission opportunities to avoid disruptive interference from an interference source 250, 350. Transmission of a data packet 400 may be repeated during a plurality of data packet time slots 403, 406, 409, 412, 415, 418, 421 in a cycle to overcome any overlap between the plurality of data packet time slots 403, 406, 409, 412, 415, 418, 421 and the interference interval 433. Accordingly, a data packet 400 may be transmitted for a plurality of data packet time slots 403, 406, 409, 412, 415, 418, 421 to overcome the interference signal 430 generated by the interference source 350 during the interference interval 433 and to ensure that the transmission of the data packet 400 is not interrupted. The interference signal 430, for example, may shield the transmission of the data packet 400 during the plurality of data packets time slots 406, 409, 412 within the interference interval 433.

Lines #3 and #4 illustrate two-way transmissions of a data packet 440 on a data communication link through an over-the-air channel on a predetermined RF carrier in a TDMA system from a console hub 320 to a plurality of terminal devices 310, 311, 312, 313 and from the plurality of terminal devices 310, 311, 312, 313 back to the console hub 320. In Line #3, the data packet 440 transmitted from a transmitting unit 334 adapted to a console hub 320 may provide data and a timing basis, which is further discussed below, for the plurality of terminal devices 310, 311, 312, 313 through a plurality of sub-data packets, generally shown as 450, 451, 452, and 453, respectively. For example, the sub-data packet 450 within the data packet 440 may provide data and the timing basis for the terminal device 310. Accordingly, the sub-data packet 451 provides data and timing basis for the terminal device 311, the sub-data packet 452 provides data and timing basis for the terminal device 312, and so on. In Line #4, the data packet 470 provides the hub 320 with a plurality of sub-data packets, generally shown as 480, 481, 482, and 483, from the plurality of terminal devices 310, 311, 312, 313, respectively. The timing basis, which may be for a TDMA system, provides a protocol to the terminal devices 310, 311, 312, 313 to ensure that mutual interference does not exist between the transmission of sub-data packets 480, 481, 482, 483 from the plurality of terminal devices 310, 311, 312, 313, respectively. For example, the timing basis ensures transmission of the sub-data packet 480 from the terminal device 310 does not interfere with the transmission of the sub-data packet 481 from the terminal device 311. Accordingly, the timing basis prevents transmission of the sub-data packet 481 from the terminal device 311 from interrupting transmission of the sub-data packet 480 from the terminal device 310.

Figure 5:
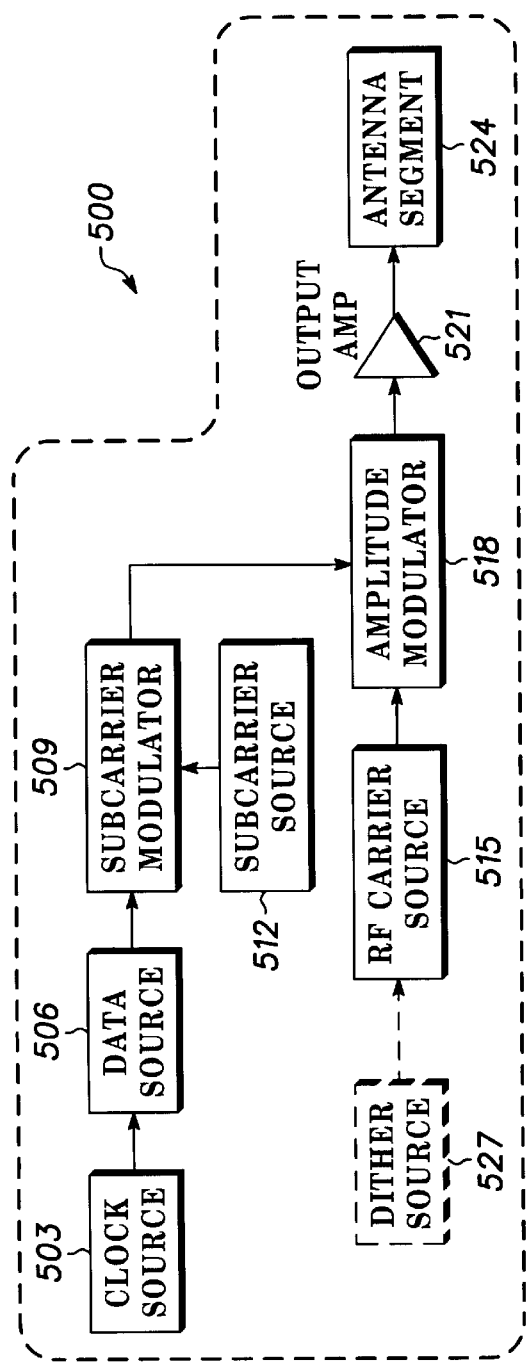
FIG. 5 is a block diagram of a transmitting unit associated with the present invention.

As shown in FIG. 5, a transmitting unit 500 generally includes, but is not limited to, a clock source 503, a data source 506, a subcarrier modulator 509, a subcarrier source 512, a radio frequency (RF) carrier source 515, an amplitude modulator 518, an output amplifier 521, and an antenna segment 524. A dither source 527 may be included in the transmitting unit 500. The clock source 503, which provides a clock signal, is coupled to the data source 506. The data source 506 and the subcarrier source 512 are coupled to the subcarrier modulator 509, which may be, but is not limited to, a phase shift key (PSK) modulator, a quadrature phase shift key (QPSK) modulator, and a frequency shift key (FSK) modulator. The subcarrier modulator 509 and the RF carrier source 515 are coupled to the amplitude modulator 518. The RF carrier source 515 may be, but is not limited to, a free-running oscillator, a phase locked loop with a reference frequency generated by the clock source 503, a phase locked loop with a reference frequency generated by the subcarrier source 512, and a phase locked loop with a reference frequency unrelated to either the clock source 503 and the subcarrier source 512. The dither source 527, which may be a periodic or a noise-like signal, may be coupled to the RF carrier source 515. The amplitude modulator 518 is coupled to the output amplifier 521. The output amplifier 521 is coupled to the antenna segment 524. Circuit components such as the data source 506, the subcarrier modulator 509, the amplitude modulator 518, the output amplifier 521, and the antenna segment 524 may include a low pass filter, a high pass filter, or a bandpass filter to control or limit the transmitted RF spectrum. While some of the individual circuit component types are indicated in FIG. 5, one of ordinary skill in the art will readily recognize that other types of components may be chosen.

The clock source 503 provides a data clock at a clock rate of, but not limited to, 10 Megahertz (MHz) to the data source 506. The clock signal may be, but is not limited to, a square waveform. The data source 506, provides data at a bit rate of, but not limited to, 10 Megabit-per-second (Mb/s) to the subcarrier modulator 509. The data source 506 may differentially encode the data, which includes information and overhead data such as, but not limited to, identifiers, error detection codes, and acknowledgment codes. The subcarrier modulator 509, which is further discussed in detail below, modulates the subcarrier generated by the subcarrier source 512 with the data to generate a modulated subcarrier. The subcarrier generated by the subcarrier source 512 may be, but is not limited to, 10 MHz. In the preferred embodiment, the subcarrier modulator 509 may be a PSK modulator that generates a phase shift key modulation of the data generated by the data source 506 and the subcarrier generated by the subcarrier source 512. The PSK modulator generates a modulated subcarrier with Manchester coded or differential Manchester coded data when the subcarrier frequency is the same as the data clock rate. For example, when the clock signal provided by the clock source 503 has a clock rate of 10 MHz and the frequency of the subcarrier generated by the subcarrier source 512 is 10 MHz then Manchester coded or differential Manchester coded data may be generated. In an alternate embodiment, the subcarrier modulator 509 may be a QPSK modulator that produces a QPSK output as one of ordinary skill in the art will readily recognize. In another alternate embodiment, the subcarrier modulator 509 may be a FSK modulator, which is further discussed in detail below. The RF carrier source 515 generates an RF carrier to transmit the operating signal by the transmitting unit 500. As noted above, the RF carrier source 515 may be a free-running oscillator operable at a specific frequency in a band such as 2.4 to 2.4835 GHz. Alternate embodiments of the RF carrier source 515 are further discussed in detail below. The amplitude modulator 518 modulates the RF carrier generated by the RF carrier source 515 with the modulated subcarrier generated by the subcarrier modulator 509. The output of the amplitude modulator 518 is coupled to the output amplifier 521. In an alternate embodiment, the amplitude modulator 518 may be integrated into the output amplifier 521. The output amplifier 521, which may supply 10 milli-Watts (mW) of RF power, generates an operating signal to the antenna segment 524 for transmission.

The dither source 527, which may be coupled to the RF carrier source 515 as noted above, spreads the spectral components to reduce peak power spectral density (PSD) and to protect against multi-path nulls and interference. The dither source 527 provides an analog signal such as a periodic signal or a noise-like signal, or a filtered pseudo-random digital signal to phase modulate or frequency modulate the RF carrier generated by the RF carrier source 515. The dither source 527 may be implemented by analog techniques such as, but not limited to, a voltage controlled oscillator (VCO) and a phase modulator. In an alternate embodiment, the dither source 527 may be implemented by digital techniques such as, but not limited to, a direct digital synthesis unit to accurately control the transmitted RF spectrum.

Figure 6:
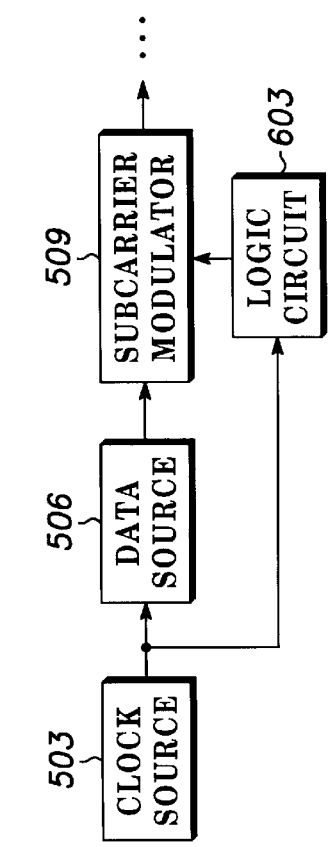
FIG. 6 is a block diagram of an alternate embodiment of a subcarrier source associated with the present invention.

In an alternate embodiment of the present invention, the data clock and the subcarrier may be synchronized for conservation of spectrum and efficient use of communication resources. As shown in FIG. 6, the subcarrier source 512 is provided by a phase shift or a time delay of the clock source 503. A logic circuit 603, which is an application specific integrated circuit (ASIC) that one of ordinary skill in the art will readily recognize to phase shift or delay in time of a signal, is coupled to the clock source 503 and the subcarrier modulator 509. The logic circuit 603 may generate a phase shift or a time delay of a data clock generated from the clock source 503, which in turn, is the subcarrier to the subcarrier modulator 509. The subcarrier frequency is locked and is equal to the data clock frequency generated by the clock source 503.

Figure 7:
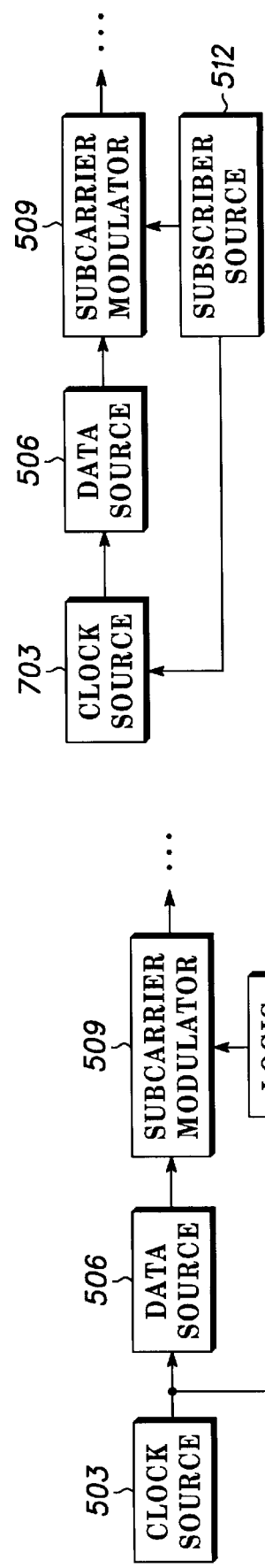
FIG. 7 is a block diagram of an alternate embodiment of a clock source associated with the present invention.

In another alternate embodiment of the present invention, the data clock and the subcarrier may be synchronized as shown in FIG. 7 for conservation of spectrum and efficient use of communication resources. A fixed frequency divider 703 is coupled to the data source 506. The subcarrier source 512 is coupled to the frequency divider 703. A data clock is generated by the subcarrier source 512 through the frequency divider 703 to the data source 506. The data clock frequency is locked and is equal to the subcarrier frequency generated by the subcarrier source 512 and the frequency divider 703.

Figure 8:
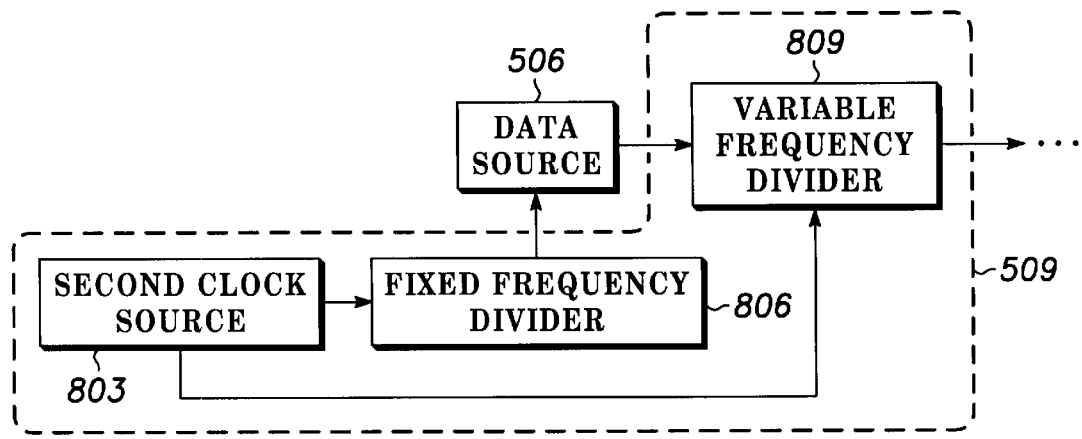
FIG. 8 is a block diagram of an alternate embodiment of a subcarrier modulator associated with the present invention.

As noted above, an alternate embodiment of the subcarrier modulator 509 may be a FSK modulator, which is shown in FIG. 8. A second clock source 803 which operates on a higher frequency than the clock source 503, is coupled to a fixed frequency divider 806 and a variable frequency divider 809. The fixed frequency divider 806 is coupled to the data source 506, which is coupled to the variable frequency divider 809. The output of the variable frequency divider 809 is coupled to the amplitude modulator 515. The second clock source 803 and the fixed frequency divider 806 may generate a data clock to the data source 506. FSK modulation may be described in terms of mark and space frequencies, which are the frequencies to which the subcarrier frequency is changed to represent a logical "one" and a logical "zero". The second clock source 803 may generate the mark and space frequencies to the variable frequency divider 809. The ratio of the variable frequency divider 809 may vary in accordance with the data generated by the data source 506 to generate an FSK modulated signal. For example, the data clock to the data source 506 operates at 4 MHz and the second clock source 803 operates at 96 MHz. The variable frequency divider 809 may divide a clock signal generated from the second clock source 803 by 8 and 12 to generate clock rates of 12 MHz and 8 MHz, respectively, as the mark and space frequencies.

In place of a typical synthesizer in a radio transmitter, the RF carrier source 515 generates an RF carrier in which the transmitting unit 500 may produce the operating signal. As noted above, the RF carrier source 515 may be a free-running oscillator such as an oscillator configured to operate in a specified bandwidth. For example, the RF carrier source 515 may be a 2.42 GHz oscillator and accordingly, the transmitting unit 500 operates within 2.4 to 2.4835 GHz, which is the license-free 2.4 GHz ISM band in most countries of the world. As one of ordinary skill in the art will readily recognize, the free-running oscillator may be stabilized by, but is not limited to, an LC circuit, a strip line resonator, a ceramic resonator, and a quartz crystal resonator.

Figure 9:
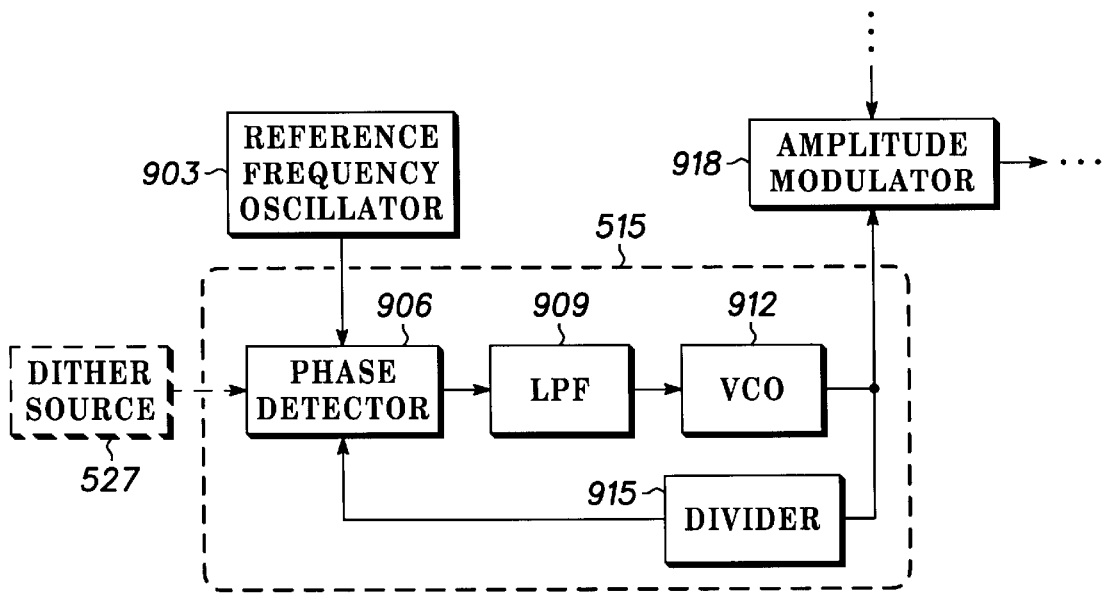
FIG. 9 is a block diagram of an alternate embodiment of a radio frequency (RF) carrier source associated with the present invention.

In an alternate embodiment as shown in FIG. 9, the RF carrier source 515 may be a phase locked loop (PLL) frequency synthesizer configured as an application specific integrated circuit (ASIC) with the clock source 503 providing a reference frequency, and a PLL with the subcarrier source 512 providing a reference frequency that generates a RF carrier to operate the transmitting unit 500. A phase locked loop that generates an RF carrier generally includes a reference frequency source 903, a phase detector 906, a low-pass filter 909, a voltage controlled oscillator (VCO) 912, and a frequency divider 915. The reference frequency source 903, which is coupled to the phase detector 906, provides a reference frequency for RF carrier source 515. The reference frequency source 903 may be, but is not limited to, a clock source 503 and a subcarrier source 512. The phase detector 906, which is coupled to the low-pass filter 909, may include, but not limited to, a phase accumulator. As noted above, a direct digital synthesizer unit may perform the dithering function in the dither source 527. The direct digital synthesizer unit advances or delays the phase accumulator in accordance to a digital representation of the dither signal. The low-pass filter 909 is coupled to the VCO 912. The VCO 912 is coupled to the amplitude modulator 918 and the frequency divider 915, which may be a fixed frequency divider or a variable frequency divider. The output of the frequency divider 915 is a feedback input coupled to the phase detector 906.

Figure 10:
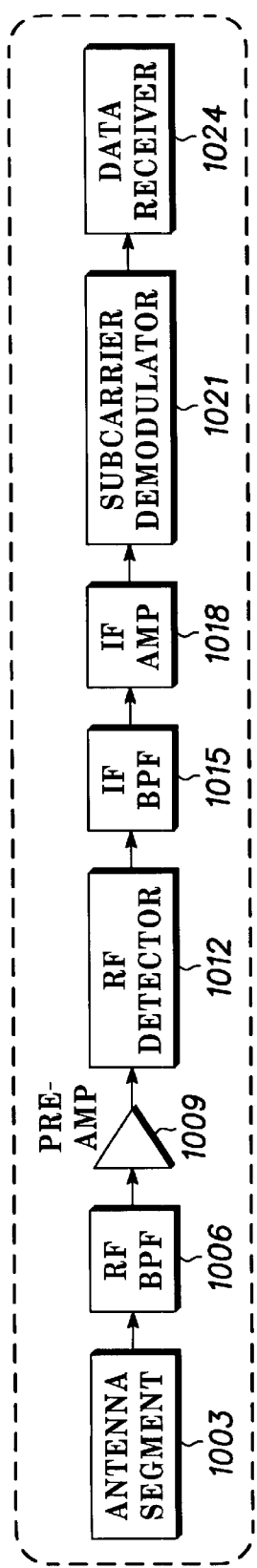
FIG. 10 is a block diagram of a receiving unit associated with the present invention.

As mentioned above, typically a communication receiver utilizes a synthesizer and a heterodyne scheme. The present invention, however, provides a low-power and low-cost receiving unit without the use of a synthesizer or a heterodyne scheme to receive an operating signal transmitted from a transmitting unit 500. As illustrated in FIG. 10, the preferred embodiment of the receiving unit 1000 generally includes, but is not limited to, an antenna segment 1003, a RF bandpass filter 1006, a pre-amplifier 1009, an RF detector 1012, an IF bandpass filter 1015, an intermediate-frequency (IF) amplifier 1018, a subcarrier demodulator 1021, and a data receiver 1024. The antenna segment 1003 is coupled to the RF bandpass filter 1006, which may be an inductor-capacitor (LC) circuit as one of ordinary skill in the art will readily recognize. The RF bandpass filter 1006 is coupled to the pre-amplifier 1009, which may have, but is not limited to, a gain of 20 dB. The pre-amplifier 1009 is coupled to the RF detector 1012, which may be a diode detector. The RF detector 1012 is coupled to the IF bandpass filter 1015, which may be an inductor-capacitor (LC) circuit as one of ordinary skill in the art will readily recognize. The IF bandpass filter 1015 is coupled to the IF amplifier 1018, which may be a Motorola MC13155 wideband integrated circuit. The IF amplifier 1018 is coupled to the subcarrier demodulator 1021, which may be, but is not limited to, a non-coherent differential phase detector, a coherent phase detector, and a discriminator. The subcarrier demodulator 1021 is coupled to the data receiver 1024, which may be, but is not limited to, an application specific integrated circuit (ASIC), a microprocessor, and a microcontroller.

In the embodiment of FIG. 10, the receiving unit 1000 recovers an operating signal transmitted by the transmitting unit 500 through the antenna segment 1003. The operating signal passes through the RF bandpass filter 1006, which attenuates signals that are outside the band of the predetermined RF carrier specified the RF carrier source 515. The output of the RF bandpass filter 1006 is coupled to the pre-amplifier 1009 to amplify the filtered operating signal. In an alternate embodiment, the receiving unit 1000 may not include the pre-amplifier 1009. Accordingly, the output of the RF bandpass filter 1006 may be coupled directly to the RF detector 1012 without passing through the pre-amplifier 1009. The RF detector 1012 performs an envelope detection to the filtered operating signal to produce a modulated subcarrier signal that corresponds to the output of the subcarrier modulator 509 of the transmitting unit 500 with distortions and noise added by the over-the-air channel. The output of the RF detector 1012 is centered approximately at the subcarrier frequency by the IF bandpass filter 1015. The IF bandpass filter 1015 may be adapted into the RF detector 1012 or the IF amplifier 1018, which may be a commercially available device operable at 10.7 MHz. When a PSK modulator is adapted to perform the subcarrier modulation to produce a Manchester coded or a differential Manchester coded signal by the transmitting unit 500, then IF amplifier 1018 may be an amplitude limiting amplifier such as a Motorola MC 13155 wideband IF integrated circuit. An amplitude limiting amplifier is configured to limit noise when a signal is absent. When an alternate embodiment of the subcarrier modulator 509 such as a QPSK modulator is implemented by the transmitting unit 500, then the IF amplifier 1018 is configured to operate with an automatic gain control (AGC) to adjust the gain of the pre-amplifier 1009, the RF detector 1012, and the IF amplifier 1018 itself. The AGC prevents harmful amplitude distortions. The output of the IF amplifier 1018 is coupled to the subcarrier demodulator 1021, which is further discussed in details below to recover the data. The data receiver 1024 may provide clock recovery, detect for errors, correct the detected errors, record acknowledgments, receive unit identifiers, and process the information in the data. The data receiver 1024 may send a command to a transmitting unit 500 corresponding to the receiving unit 1000 to transmit a signal, which may acknowledge a successful receipt of a transmission.

Figure 11:
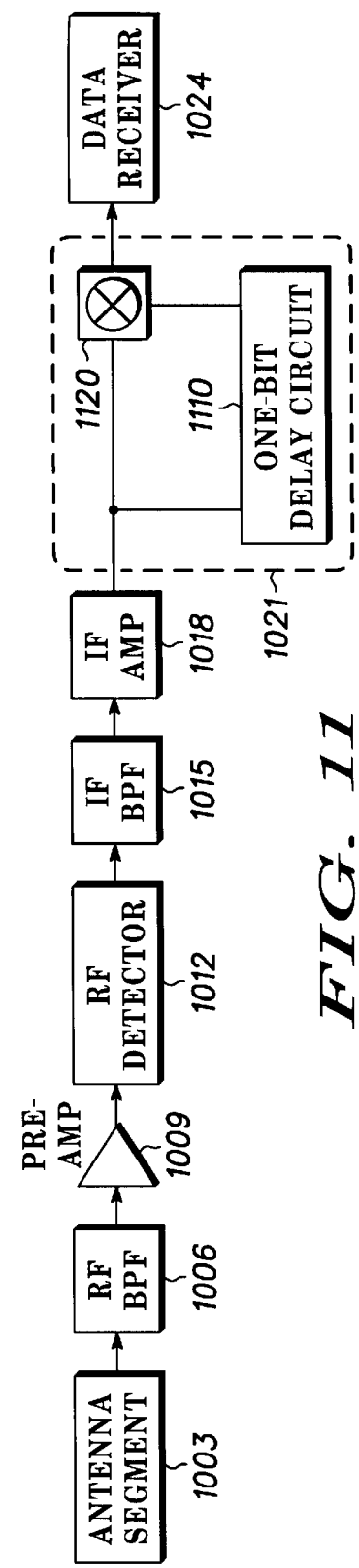
FIG. 11 is a block diagram of an alternate embodiment of a subcarrier demodulator associated with the present invention.

The modulated subcarrier signal generated by the IF amplifier 1018 may be demodulated by the subcarrier demodulator 1021. As illustrated in FIG. 11, a non-coherent differential phase detector is the preferred embodiment of the subcarrier demodulator 1021. The non-coherent differential phase detector generally includes an application integrated circuit (ASIC) comprising a one-bit delay circuit 1110 and an exclusive-OR (XOR) logic circuit 1 120 as one of ordinary skill in the art will readily recognize. The modulated subcarrier signal generated by the IF amplifier 1018 is delayed by a time delay of approximately one-bit period in length, which is modulo-two summed with the modulated subcarrier signal generated by the IF amplifier 1018 to produce a binary output. The binary output is further processed by a decision circuit to generate data comprising logical ones and logical zeros.

A coherent phase detector, which is an alternate embodiment of the subcarrier demodulator 1021, generally includes a subcarrier recovery circuit as one ordinary skill in the art will readily recognize. The subcarrier recovery circuit may replace the one-bit delay circuit 1110 in the non-coherent differential phase detector as described above. The subcarrier recovery circuit is coupled to an XOR logic circuit 1120, which may be enhanced to provide decoding of multi-level forms of PSK modulation. The coherent phase detector may demodulate a modulated subcarrier signal generated by PSK and QPSK modulations.

In another alternate embodiment of the subcarrier demodulator 1021, a discriminator may replace the non-coherent differential phase detector and the coherent phase detector to demodulate a modulated subcarrier signal generated by FSK modulation. The discriminator is coupled to the IF amplifier 1018 and the data receiver 1024.

Figure 12:
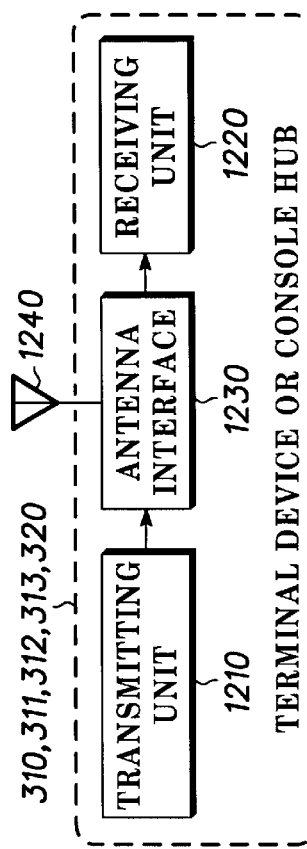
FIG. 12 is a block diagram of an antenna interface associated with the present invention.

Now referring back to FIG. 3, each transmitting units 330, 331, 332, 333, 334 and receiving units 340, 341, 342, 343, 344 are coupled to an antenna 350, 351, 352, 353, 354, 360, 361, 362, 363, 364 for two-way transmissions. In an alternate embodiment as shown in FIG. 12, a transmitting unit 1210 and a receiving unit 1220 for a terminal device 310, 311, 312, 313 or a console hub 320 are coupled to an antenna interface 1230 for increase efficient use of communication resources. The antenna interface 1230 is coupled to an antenna 1240. The transmitting unit 1210 and the receiving unit 1220 may establish communication links through an over-the-air channel on a predetermined RF carrier by transmitting and receiving a signal, respectively, on a single antenna 1240.

Many changes and modifications could be made to the invention without departing from the fair scope and spirit thereof. The scope of some changes is discussed above. The scope of others will become apparent from the appended claims.

What is claimed:

1. A system for generating a short-range wireless data communication link through an over-the-air channel on a predetermined radio frequency carrier comprising:
   a transmitting unit that transmits an operating signal, the transmitting unit comprising:
   a clock source that provides a data clock;
   a data source that provides data;
   a subcarrier modulator coupled to the data source;
   a subcarrier source coupled to the subcarrier modulator;
   a radio frequency carrier source that operates on the predetermined radio frequency carrier;
   a dither unit coupled to the radio frequency carrier source;
   an amplitude modulator coupled to the radio frequency carrier source and the subcarrier modulator; and
   an antenna segment coupled to the amplitude modulator; a receiving unit that receives the operating signal from the transmitting unit, the receiving unit comprising:
   an antenna segment that receives the operating signal through an over-the-air channel on the predetermined radio frequency carrier;
   a radio frequency bandpass filter coupled to the antenna segment;
   an envelope detector coupled to the radio frequency bandpass filter;
   an intermediate frequency amplifier coupled to the envelope detector; and
   a subcarrier demodulator coupled to the intermediate frequency amplifier;
   wherein the transmitting unit is adapted to operate at the predetermined radio frequency carrier to transmit the operating signal carrying the data, and wherein the receiving unit is adapted to operate at the predetermined radio frequency carrier to receive the operating signal carrying the data.

2. The system of claim 1, wherein the dither unit comprises a direct digital synthesizer unit.

3. The system of claim 1, wherein the dither unit further comprises one of a periodic dithering signal generator and a noise-like dithering signal generator.

4. The system of claim 1, wherein the transmitting unit further comprises an output amplifier.

5. The system of claim 1, wherein the data source provides differentially encoded data.

6. The system of claim 1, wherein the subcarrier modulator comprises one of a phase shift key modulator, a quadrature phase shift key modulator, and a frequency shift key modulator.

7. The system of claim 1, wherein the radio frequency carrier source comprises one of a free-running oscillator and a phase locked loop frequency synthesizer.

8. The system of claim 1, wherein the transmitting unit is adaptable to one of a video game controller, a video game console, a computer, a computer mouse, a keyboard, a printer, a remote controller, a television, a stereo, digital video disc player, a video cassette recorder, a compact disc player, a headset, and an electronic planner.

9. The system of claim 1, wherein the envelope detector comprises a diode detector.

10. The system of claim 1, wherein the receiving unit further comprises a pre-amplifier coupled to the radio frequency bandpass filter.

11. The system of claim 1, wherein the receiving unit further comprises a intermediate frequency bandpass filter coupled to the envelope detector.

12. The system of claim 1, wherein the subcarrier demodulator is one of a non-coherent differential phase detector, a coherent phase detector, and a discriminator.

13. The system of claim 1, wherein the receiving unit is adaptable to one of a video game controller, a video game console, a computer, a computer mouse, a keyboard, a printer, a remote controller, a television, a stereo, digital video disc player, a video cassette recorder, a compact disc player, a headset, and an electronic planner.

14. The system of claim 1 further comprises an antenna interface coupling the transmitting unit and the receiving unit.

15. In a wireless communication system, a transmitting unit adapted to transmit an operating signal carrying data to generate a short-range wireless data communication link through an over-the-air channel on a predetermined radio frequency carrier, the transmitting unit comprising:
   a clock source that provides a data clock;
   a data source that provides the data;
   a subcarrier modulator coupled to the data source;
   a subcarrier source coupled to the subcarrier modulator;
   a radio frequency carrier source that operates on the predetermined radio frequency carrier;
   a dither unit coupled to the radio frequency carrier source;
   an amplitude modulator coupled to the radio frequency carrier source and the subcarrier modulator; and
   an antenna segment coupled to the amplitude modulator.

16. The transmitting unit of claim 15, wherein the dither unit further comprises one of a periodic dithering signal generator and a noise-like dithering signal generator.

17. The transmitting unit of claim 16 further comprising a direct digital synthesizer unit.

18. The transmitting unit of claim 15 further comprising an output amplifier.

19. The transmitting unit of claim 15, wherein the data source provides differentially encoded data.

20. The transmitting unit of claim 15, wherein the subcarrier modulator comprises one of a phase shift key modulator, a quadrature phase shift key modulator, and a frequency shift key modulator.

21. The transmitting unit of claim 15, wherein the radio frequency carrier source comprises one of a free-running oscillator and a phase locked loop frequency synthesizer.

22. The transmitting unit of claim 15, the transmitting unit being adaptable to one of a video game controller, a video game console, a computer, a computer mouse, a keyboard, a printer, a remote controller, a television, a stereo, digital video disc player, a video cassette recorder, a compact disc player, a headset, and an electronic planner.

23. A method for generating a short-range wireless communication link through an over-the-air channel on a predetermined radio frequency carrier comprising the steps of:

providing a data clock;

providing data;

generating a subcarrier;

modulating the subcarrier with the data to generate a modulated subcarrier;

generating the predetermined radio frequency carrier;

dithering the predetermined radio frequency carrier;

amplitude modulating the predetermined radio frequency carrier with the modulated subcarrier to generate an operating signal;

transmitting the operating signal through an over-the-air channel at the predetermined radio frequency carrier;

receiving the operating signal;

filtering the operating signal;

envelope detecting the filtered operating signal to recover a received modulated subcarrier;

intermediate frequency amplifying the received modulated subcarrier; and demodulating modulated subcarrier to recover the data.

24. The method of claim 23, wherein the step of modulating the subcarrier with the data to generate a modulated subcarrier comprises one of a step of phase shift key modulating the subcarrier with the data to generate a modulated subcarrier, a step of quadrature phase shift key modulating the subcarrier with the data to generate a modulated subcarrier, and a step of frequency shift key modulating the subcarrier with the data to generate a modulated subcarrier.

25. The method of claim 23, wherein the step of providing data comprises the step of providing differentially encoded data.

26. The method of claim 23 further comprising the step of amplifying the filtered operating signal.

27. The method of claim 23 further comprising the step of filtering the received modulated subcarrier.

28. A system for generating a short-range wireless communication link through an over-the-air channel on a predetermined radio frequency carrier comprising:

a means for providing a data clock;

a means for providing data;

a means for generating a subcarrier;

a means for modulating the subcarrier with the data to generate a modulated subcarrier;

a means for generating the predetermined radio frequency carrier;

means for dithering the predetermined radio frequency carrier;

a means for amplitude modulating the predetermined radio frequency with the modulated subcarrier to generate an operating signal;

a means for transmitting the operating signal;

a means for receiving the operating signal;

a means for filtering the operating signal;

a means for envelope detecting the filtered operating signal to recover a received modulated subcarrier;

a means for intermediate frequency amplifying the received modulated subcarrier; and a means for demodulating the modulated subcarrier to recover the data.

29. The system of claim 28, wherein the means for modulating the subcarrier with the data to generate a modulated subcarrier comprises one of a means for phase shift key modulating the subcarrier with the data to generate a modulated subcarrier, a means for quadrature phase shift key modulating the subcarrier with the data to generate a modulated subcarrier, and a means for frequency shift key modulating the subcarrier with the data to generate a modulated subcarrier.

30. The system of claim 28 further comprising a means for amplifying the filtered operating signal.

31. The system of claim 28 further comprising a means for filtering the received modulated subcarrier.

* * * * *